June 19, 1923.
C. OWENS
FARM IMPLEMENT
Filed July 14, 1919
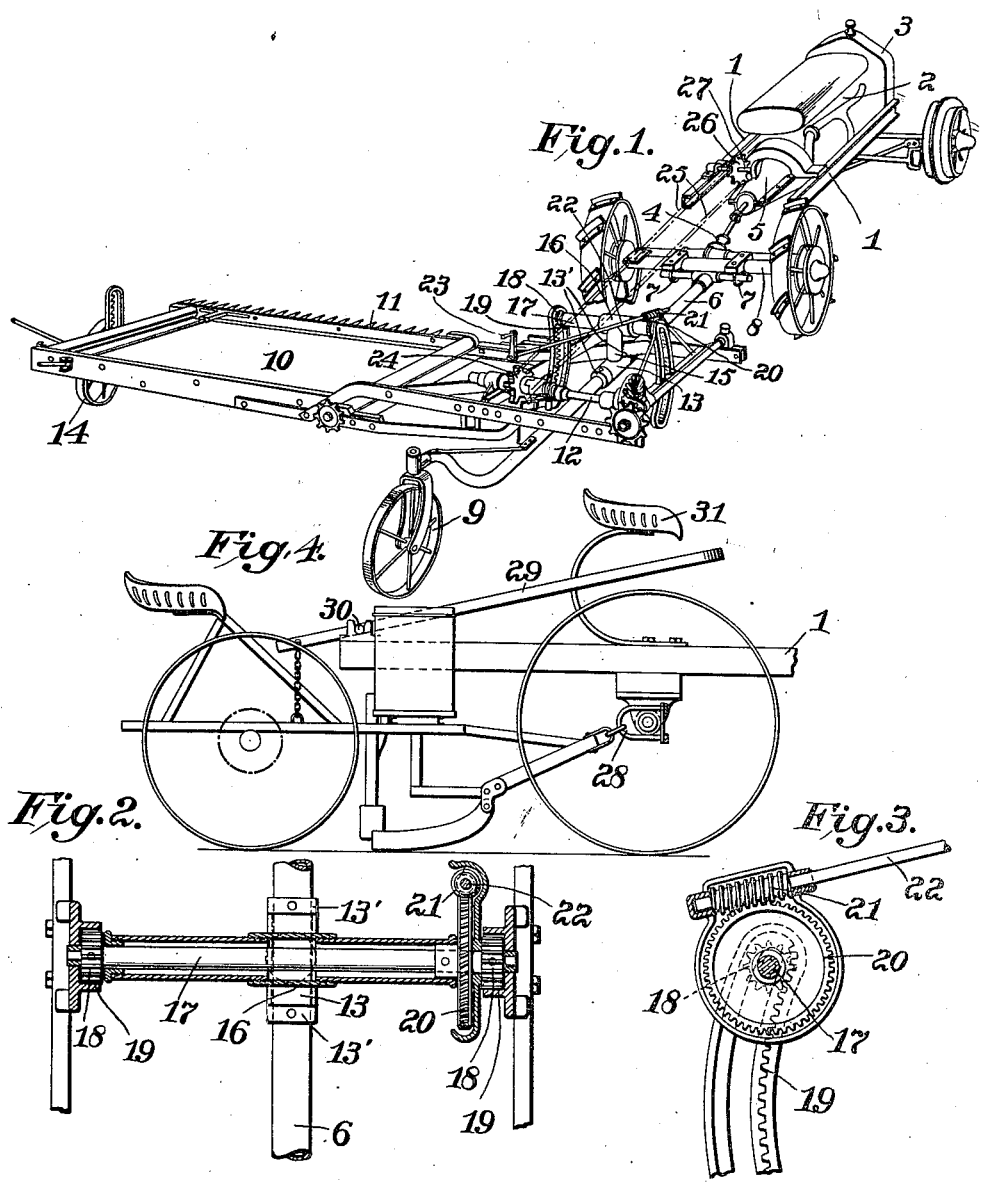
Inventor:
Charles Owens,
by Spear, Middleton, Donaldson & Hall
Attys.

Patented June 19, 1923.

1,458,990

UNITED STATES PATENT OFFICE.

CHARLES OWENS, OF CHATTANOOGA, TENNESSEE.

FARM IMPLEMENT.

Application filed July 14, 1919. Serial No. 310,600.

*To all whom it may concern:*

Be it known that I, CHARLES OWENS, a citizen of the United States, resident of Chattanooga, Tennessee, have invented certain new and useful Improvements in Farm Implements, of which the following is a specification.

The main objects of my invention are:—

To furnish the farmer with a tractor light enough in itself to be used to cultivate crops without packing the soil, and at the same time capable of doing the heaviest farm work; also to supply the farmer with a convertible farm tractor which, when combined with any suitable horse drawn implement, becomes an integral part of such farm implement requiring only the same skill which will be involved in the ordinary operation of the implement and when so combined the implement transmits to the tractor the tread weight necessary to enable the tractor to draw its load; to lessen the cost of operation of the various horse drawn farm implements by combining them with the convertible tractor in such a manner that the tractor itself performs one or more of the functions of the implement; to furnish the farmer with a convertible tractor which can readily be combined with any suitable horse drawn farm implement to form a single unit and which, when so combined, can be handled as readily or with greater ease than when used by itself; to provide the farmer with a convertible form of tractor so constructed and of such a wide range of adaptability to all classes of farm work as to enable him to convert any desired horse drawn implement at present in common use into a motor operated implement with substantially the same ease and with no greater expenditure of time than is required to hitch a team of horses to the ordinary implement.

Other objects of the invention will be clear from the following specification.

In the accompanying drawings Figure 1 is a perspective view of the portion of a binder, namely, the platform and associated parts, attached to the tractor so as to form one composite unit.

Figure 2 is a detail view with parts in section and parts in elevation of the shaft of the bull wheel, with means for adjusting the same to adjust the position of the platform in relation to the ground.

Figure 3 is a detail view of parts shown in Figure 2.

Figure 4 is a side elevation of the tractor combined with another form of farm implement, this being in the particular case illustrated, a planter.

I have shown the invention in connection with a reaper and binder of standard type, and the tractor is built of standard parts. In the particular embodiment of my invention, illustrated as an example, the farm implement weighs, say eighteen hundred pounds. The tractor element weighs sixteen hundred pounds.

Ordinarily tractors are employed as means for dragging the implement, taking the place of and pulling the entire farm implement, as would a team of horses.

Under this condition, in order to get the necessary traction or tread-weight, the tractor itself is ordinarily made heavy and consequently cumbersome, and therefore if calculated in weight to give enough traction for drawing a binder it is much heavier than necessary for drawing a lighter implement such as a mower, or a cultivator or a plow. Power is therefore wasted because the tractor has to propel its own excess weight. With my improvement, however, the tread-weight necessary to draw a binder is not derived from the weight of the tractor itself, but a material part of the weight of the binder is imposed on and carried by the tractor so that its own tread-weight is augmented by this additional weight derived from the imposition of a part of the binder thereon.

The tractor is thus much lighter than one which would be used only for drawing the binder, and not partly supporting it, and thus it may be used without waste of power for drawing farm implements which are lighter than the binder such as mowers, cultivators, plows, or planters.

As before stated, the tractor is built up of standard parts such as the frame 1, the engine 2, the radiator 3, the differential 4, the transmission and its shaft 5. The engine of course may be of any suitable type. In order to impose weight onto the tractor to increase its tractive force, beyond that inherent in the tractor itself, I take the bull wheel off from the binder and connect this side of the binder with the rear end of the tractor. One way of doing this is shown in the drawing consisting of a rod 6 having a pivotal mounting at its front end with a suitable part of the tractor element. In the present case this pivotal mounting includes hangers 7 depending from the dead axle 8, in which hangers the pivot of the rod is mounted. This rod extends to a point in rear of the binder platform and it carries a caster wheel 9. The rod furnishes a support for the frame of the binder platform indicated generally at 10. The cutter is shown at 11 and the jack shaft which ordinarily is driven by the bull wheel is shown at 12. A sleeve 13 is mounted on this caster rod between fixed collars 13′ so as to turn thereon and this allows the platform to rise and fall to accommodate itself to uneven ground. A grain wheel 14 aids in supporting and carrying the platform.

The pivotal bearing or sleeve is adjustably connected with the platform organization to regulate the position of the cutter bar in relation to the ground. For this purpose the sleeve or pivotal bearing has an upwardly extending standard portion 15 with a transversely extending sleeve or bearing 16 at its upper end in which is mounted the ordinary bull wheel shaft 17 carrying, as usual, pinions 18 at its ends engaging with the usual racks 19 connected with the binder platform organization. This shaft is in the position ordinarily occupied by the shaft of the bull wheel and in fact this shaft is the bull wheel shaft itself minus the gear wheel commonly employed thereon for driving certain mechanism of the binder and the mounting of this shaft by means of the pinions and racks is in accordance with the usual practice.

This shaft therefore instead of being sustained at a distance above the ground by the bull wheel is sustained by the caster wheel whose rod supports the sleeve 13 and standard 15 the top of which forms a bearing for the bull wheel shaft which in turn, by means of the rack and pinions, sustains the platform organization.

This shaft 17 has a worm wheel 20 turned by a worm 21 from a shaft and handle 22, 23, by which the operator can adjust the height of the platform at this end in relation to the ground by raising or lowering the racks in relation to the bull wheel. There is adjusting means at the other end of the platform by which the platform may be adjusted in relation to the grain wheel 14. It will be seen that while the weight of the binder, ordinarily taken by the bull wheel, is partly imposed on the tractor, by reason of the connections described, the binder has as great freedom of movement in itself and is as unrestrained by its attachment to the tractor as it would have if drawn by a team. It can rise and fall in a plane from front to rear or in a transverse plane and it can tip forwardly or backwardly or laterally. The working parts of the binder are driven from the tractor by a suitable driving connection extending from the shaft 12 which in ordinary practice is driven by the bull wheel through the ordinary gear drive. This connection may be the sprocket wheel 24 which is driven by a chain 25 from a sprocket 26 on the jack shaft of the tractor which is on a jack shaft 27 driven from the transmission of the tractor. The application of this being obvious it is not shown in Figure 1.

The tractor therefore while performing the function of the draft animals also performs the function of the bull wheel in that it drives the operative parts of the binder through the connections described.

The tractor therefore becomes an element of the binder unit because part of the function of the ordinary binder organization is transferred thereto. The weight of the binder being directly imposed on the tractor, a light tractor structure is used and yet a high traction action is secured.

The binder is of the usual construction throughout. It is adapted to be horse drawn and should an accident occur to the tractor the binder can be reconverted into condition to be drawn by a team by simply placing back on it the parts removed such as the bull wheel and the drive gear and remaining parts which connect it with the tractor.

The tractor being light can be used economically for pulling other farm implements requiring less tractive force than that of the binder unit, and I have illustrated as an example in Figure 4 a planter which is hitched to the dead axle of the tractor as at 28, some of the weight being imposed on the tractor through this connection, though of course this is considerably less than in the case of the binder. For lifting the planter out of service in going to or from the field or in turning, I provide a lever 29 pivotally mounted at 30 in a bearing on the frame of the tractor so that the driver sitting in the seat 31 of the tractor can manipulate the planter to or from the ground.

It will be seen that the caster wheel bar in Figure 1 is pivoted at its front end to the tractor and that the binder platform is connected to and supported from this bar by what is, in effect, a universal joint made up of the sleeve 13 and the head or sleeve 16 which is mounted on the shaft which in ordinary practice is the bull wheel shaft.

It will be observed that the trailing implement is so attached to the tractor that it can have certain accommodating movements, for instance, vertically about the pivoted hitch and certain tipping movements, but the attaching means is such that the trailing implement does not have lateral swinging movement in a direction across the longitudinal axis of the tractor, or in other words, it does not have individual swinging movement from side to side horizontally. In this connection, the caster wheel accommodates itself to all turning movements of the apparatus as a whole.

I claim:

1. In combination with a tractor and its traction wheels, a bar pivotally connected at its front end to the tractor to rise and fall in a vertical plane in relation thereto, said bar trailing behind the traction wheels of the tractor, a caster wheel at the rear end of said bar, a standard having a pivotal connection with said bar to swing laterally in relation thereto and extending up therefrom, a binder bull wheel shaft journalled in the upper end of said standard, a reaper frame hung from said bull wheel shaft and a driving connection extending rearwardly from the tractor for driving the mechanism located on the reaper, substantially as described.

2. In combination with a tractor and its traction wheels, a frame member trailing behind the tractor and its traction wheels and pivotally connected at its front end to the tractor to rise and fall in a vertical plane, a caster wheel at the rear end of said trailing frame member, a frame swivelled to said frame member forward of the caster wheel and extending laterally in relation to the said trailing frame member, said swivelled frame having the usual grain wheel, substantially as described.

3. An attachment for tractors adapted to trail behind the same comprising a frame member having means at its front end to pivotally connect with the tractor frame and to allow the said trailing frame member to rise and fall in a vertical plane, a caster wheel at the rear end of said frame member, a reaper frame extending laterally from the said frame member and a swivel connection between the reaper frame and the said frame member, substantially as described.

4. In combination with a tractor, a bar having a pivotal connection at its front end therewith and trailing behind the tractor, said bar having movement by reason of its pivot connection in a vertical plane and having a cylindrical bearing at an intermediate point, a sleeve turnable on said bearing, collars for holding said sleeve in position, a standard extending upwardly from said sleeve carrying at its upper end a sleeve arranged in a plane at right angles to the sleeve first mentioned, a bull wheel shaft journalled in the upper sleeve and a reaper frame hung from said bull wheel shaft, substantially as described.

5. In combination with a tractor and its traction wheels, a grain binder having a platform, a connection between the binder and the tractor to draw the binder as a trailer, said connection having a universal joint supporting the binder to permit the latter to tip laterally or in the longitudinal direction of the cutter bar and to tip forwardly and backwardly to permit the cutter bar to be raised or lowered and means associated with the connection to raise and lower the binder platform as a whole, said connection having a trailing wheel to support it and the binder and thus together with the tractor taking the place of the ordinary bull wheel in performing the supporting function, said connection imposing its weight upon the tractor to be distributed substantially equally to the two traction wheels, and a driving connection from the power plant of the tractor to the binder mechanism.

6. In combination with a tractor having its own chassis, power plant and rear traction wheels, a frame member pivotally connected to the tractor and trailing in connection thereto, a supporting wheel at the rear of the pivoted frame member, a binder platform mechanism carried thereby, a universal joint connection, by which the binder platform is hung from said pivotally mounted frame member, and a driving connection from the power plant of the tractor to said mechanism to drive the latter.

7. In combination with a tractor having its own chassis, power plant and rear traction wheels, a frame member pivotally connected to the tractor and trailing in connection therewith, a supporting wheel at the rear of the pivoted frame member, a binder platform mechanism carried thereby, a universal joint connection, by which the binder platform is hung from said pivotally mounted frame member, and a driving connection from the power plant of the tractor to said mechanism to drive the latter, said universal connection comprising in part the bull wheel shaft from which the bull wheel has been removed.

8. In combination with a tractor having its own chassis, power plant and rear traction wheels, a frame member pivotally connected to the tractor and trailing in connection therewith, a supporting wheel at the rear of the pivoted frame member, a binder platform mechanism carried thereby, a universal joint connection, by which the binder platform is hung from said pivotally mounted frame member, and a driving connection from the power plant of the tractor to said mechanism to drive the latter, said driving connection extending from a jack shaft of the power plant to a jack shaft on the binder platform, which latter is ordinarily driven from the bull wheel shaft.

9. A tractor member having its own chassis, power plant and rear traction wheels in combination with a farm implement capable substantially of functioning as a horse drawn implement when separated from the tractor, and a vertically movable connection between the rear part of the tractor and the farm implement to draw the latter as a trailer, said connection holding the farm implement longitudinally in rigid alignment with the tractor, both in going ahead, backing or turning, while imposing weight of the farm implement on the traction wheels of the tractor and allowing vertical movement of the farm implement relative to the tractor, and a swivelled castor wheel at the rear of the farm implement, substantially as described.

10. A tractor having its own chassis, power plant, and rear traction wheels and steering front wheels, a farm implement capable substantially of functioning as a horse drawn implement, a connection between said farm implement and the tractor to haul the implement as a trailer and to maintain it in longitudinal alignment with the tractor under both pulling and turning conditions, said connection being pivoted to permit vertical movement of the tractor and implement relative to each other, a jack shaft on the tractor, and a connection between said jack shaft and the mechanism of the farm implement, the said pivotal connection serving to impose the weight of the farm implement upon the tractor, said jack shaft connection maintaining its longitudinal alignment, and said farm implement being pivotally hung on the said connection to tip forwardly and backwardly, or laterally.

11. A tractor having its own chassis, power plant, front steering wheels and rear traction wheels in combination with a farm implement hitched thereto as a trailer, a frame member forming said hitch, pivoted at its front end to the tractor but held against lateral deflection in respect to said tractor to maintain the farm implement and tractor in longitudinal alignment at all times, while allowing weight of the implement to be imposed on the rear traction wheels of the tractor, a caster wheel swivelled at the rear of said frame member, a vertically adjustable universal joint connection between said frame member and the body of the farm implement, a jack shaft on the tractor and a driving connection between said jack shaft and mechanism of the farm implement, said driving connection being maintained in one longitudinal plane in respect to the tractor and farm implement, substantially as described.

12. In combination with a tractor a bar or frame extending from the rear thereof and pivotally connected with the tractor to move relative thereto in a vertical plane, and held against lateral displacement or pivotal movement in relation to said tractor, said bar extending rearwardly from the tractor substantially parallel with the line of draft and having a castor wheel at its rear end, and means by which a farm implement may be detachably attached to said bar or frame intermediate of the caster wheel and the pivotal connection, the major portion of said farm implement being supported on said bar to impose its weight on the tractor, substantially as described.

In testimony whereof I affix my signature.

CHARLES OWENS.